(12) United States Patent
Thompson et al.

(10) Patent No.: US 7,449,059 B2
(45) Date of Patent: Nov. 11, 2008

(54) CONDITIONING METHOD FOR INDANTHRONE PIGMENTS

(75) Inventors: Brian Thompson, Goose Creek, SC (US); John Britanak, Summerville, SC (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 11/832,405

(22) Filed: Aug. 1, 2007

(65) Prior Publication Data
US 2008/0028991 A1    Feb. 7, 2008

Related U.S. Application Data

(60) Provisional application No. 60/834,817, filed on Aug. 2, 2006.

(51) Int. Cl.
*C09B 67/20* (2006.01)
*C09B 67/00* (2006.01)
*C09B 67/10* (2006.01)
*C08K 5/3462* (2006.01)

(52) U.S. Cl. ............. 106/498; 106/493; 544/339
(58) Field of Classification Search .......... 106/498, 106/493; 544/339
See application file for complete search history.

(56) References Cited

U.S. PATENT DOCUMENTS

| | | | |
|---|---|---|---|
| 4,102,704 A | | 7/1978 | Fournier et al. |
| 4,298,526 A | * | 11/1981 | Sappok et al. ............ 540/122 |
| 4,451,654 A | * | 5/1984 | Graser et al. ............ 546/34 |
| 5,788,759 A | * | 8/1998 | Takao et al. ............ 106/498 |
| 5,900,050 A | | 5/1999 | Hayden et al. |
| 6,013,126 A | | 1/2000 | Shannon et al. |
| 7,034,080 B1 | * | 4/2006 | Ohrbom et al. ............ 525/278 |
| 7,056,378 B2 | * | 6/2006 | Weber et al. ............ 106/493 |

FOREIGN PATENT DOCUMENTS

| | | |
|---|---|---|
| BE | 660978 | 7/1965 |
| DE | 3522680 | 1/1987 |
| FR | 1538270 | 8/1968 |
| JP | 11-130974 | 5/1999 |
| JP | 11-269401 | 10/1999 |

OTHER PUBLICATIONS

K. Merkle, et al., "Surface Treatment of Organic Pigments," Pigment Handbook, vol. 111 (New York), p. 157, no date.
R.B. McKay, "The Development of Organic Pigments with Particular Referenc eto Physical Form and Consequent Behavior in Use," Rev. Prog. Coloration, vol. 10, 1979, pp. 25-32, no month.
R.B. McKay, "Control of the application performance of classical organic pigments," JOCCA, 1989, pp. 89-93, no month.
W. Herbst et al., Industrial Organic Pigments, 1993, pp. 498-500, no month.
H. Zollinger, Color Chemistry, 1991, pp. 299-290, no month.
M.S. Whelen, "Anthraquinoneazines, The Chemistry of Synthetic Dyes and Pigments," 1955, pp. 512-522, no month.

* cited by examiner

*Primary Examiner*—Anthony J Green
(74) *Attorney, Agent, or Firm*—Dickstein, Shapiro, LLP.

(57) ABSTRACT

Crude indanthrone is milled, with or without other additives, to reduce and normalize particle size and distribution to a sub-pigmentary, near amorphous, state. The resulting highly aggregated crude powder is then treated with a heterogeneous solvent system of water and an alkyl ester of an aromatic carboxylic acid, such as methyl benzoate, to de-aggregate and grow the particles back to a pigmentary size. The conditions of the solvent treatment can be controlled with respect to temperature, time, and solvent ratio such that the desired properties of strength, shade, and dispersability are optimized.

20 Claims, No Drawings

CONDITIONING METHOD FOR INDANTHRONE PIGMENTS

This disclosure is based on provisional patent application Ser. No. 60/834,817 of Aug. 2, 2006.

BACKGROUND OF THE INVENTION

"Crude" organic pigments, i.e., pigment in the form initially obtained after being chemically synthesized, are often unsuitable for use as pigments and must be subjected to one or more additional finishing steps that modify their particle size, particle shape, and/or crystal structure to provide good pigmentary qualities. This is described, for example, in K. Merkle and H. Schafer, "Surface Treatment of Organic Pigments" in Pigment Handbook, Vol. III (New York: John Wiley & Sons, Inc., 1973), page 157; R. B. McKay, "The Development of Organic Pigments with Particular Reference to Physical Form and Consequent Behavior in Use" in Rev. Prog. Coloration, 10, 25-32 (1979); and R. B. McKay, "Control of the application performance of classical organic pigments" in JOCCA, 89-93 (1989).

The most commonly used conditioning methods involve dissolving or suspending the crude pigment in strong mineral acids, followed by precipitation, and/or milling the crude pigment. Conditioning with a strong acid involves treating the crude pigment with aqueous mineral acid such as sulfuric acid in a process known as "acid pasting" (in which an acidic solution containing protonated pigment is formed) or "acid swelling" (in which a suspension of protonated pigment is formed). After the acid treatment is completed, the pigment is precipitated by adding the strongly acidic solution to a liquid in which the pigments are completely or almost completely insoluble, such as water or methanol or other lower aliphatic alcohols, as well as mixtures thereof.

Indanthrone pigments are well known polycyclic aromatic pigments. They require conditioning before use in fibers and plastics. However, attempts to condition these pigments by salt grinding or acid pasting methods has led to products which had either poor strength and color or poor dispersability. For instance, a salt ground product was close to the desired strength and color but it did not have acceptable dispersability. Particle size measurements have shown that the size distribution of the final pigment was largely determined by the original crude size distribution and that a significant amount of undersized particles were present in the conditioned product. Presumably, these undersized particles produce tight aggregates which do not re-disperse under the intended conditions of use (extrusion processing to fibers and plastics).

Among the literature describing conditioning indanthrone pigments are:

DE 3522680 discloses crude isoindolines which were converted to pigmentary form by heating at high temperatures in alkyl benzoates after milling.

U.S. Pat. No. 6,013,126 discloses salt grinding organic pigments, including indanthrone (PB 60), then kneading with alkanoic acids to improve dispersability in plastics.

JP11269401 discloses surface treating organic pigments, including indanthrone (PB 60), resin acids onto the surface of the pigment in the presence of an anionic surfactant to give pigments with excellent dispersion and gloss properties.

JP11130974 discloses preparation of organic pigments, including indanthrone, by dissolving in an aprotic solvent (DMSO) in the presence of a base (NaOH) and water or a $C_1$-$C_4$ alcohol, and then quickly precipitating the pigment particles by addition to water, alcohol and/or an acid ($H_2SO_4$).

U.S. Pat. No. 5,900,050 discloses treating organic pigments, including indanthrone (PB 60), quaternary ammonium compounds or amines to give pigments with good dispersability in plastics.

BRIEF SUMMARY OF THE INVENTION

Crude indanthrone is milled, with or without other additives, to reduce and normalize particle size and distribution to a sub-pigmentary, near amorphous, state. The resulting highly aggregated crude powder is then treated with a heterogeneous solvent system of water and an alkyl ester of an aromatic carboxylic acid, such as methyl benzoate, to de-aggregate and grow the particles back to a pigmentary size. The conditions of the solvent treatment can be controlled with respect to temperature, time, and solvent ratio such that the desired properties of strength, shade, and dispersability are optimized.

The process of the invention provides advantages over known procedures. Current methods for adjusting the particle size and distribution of indanthrone pigments include salt grinding and acid or solvent pasting. Salt grinding is mainly a de-aggregation process. The size distribution of the final pigment is, in large part, dependant on the size distribution of the crude being milled. Any undersize particles in the crude remain in the final product and have a negative impact on such properties as dispersability and rheology. In acid/solvent pasting, the particle size and distribution is determined during the drowning/precipitation step which is difficult to control with regards to temperature and concentration. Fluctuations in these parameters lead to wider than desired size distributions. Solubility issues can also lead to undesired side reactions in acid pasting (sulfonation) if high temperatures are required to achieve full solubility of the pigment.

By taking the pigment to a sub-pigmentary particle size, the process of this invention establishes a narrow baseline starting point for subsequent particle growth. The solvency power of the aromatic ester/water mixture and the temperature can then be controlled to ensure de-aggregation and uniform particle growth. This combination leads to an optimized particle size and narrow distribution with the absence of both oversize and undersize particles, which therefore leads to a greater opportunity for optimized properties such as strength and dispersability.

DETAILED DESCRIPTION OF THE INVENTION

In accordance with the present invention, a crude indanthrone pigment is first milled to sub-pigmentary size. The crude pigment can be prepared by any methods known in the art. E.g., W. Herbst and K. Hunger, Industrial Organic Pigments (New York: VCH Publishers, Inc., 1993), pages 498-500; H. Zollinger, Color Chemistry (VCH Verlagsgesellschaft, 1991), pages 219-220 (see also page 237); and M. S. Whelen, "Anthraquinoneazines" in The Chemistry of Synthetic Dyes and Pigments, ed. H. A. Lubs (Malabar, Fla.: Robert E. Krieger Publishing Company, 1955), pages 512-522. the indanthrone pigments can be unsubstituted or partially substituted, for example, with one or more alkyl, alkoxy, halogens such as chlorine, or other substituents typical of indanthrone pigments. Underivatized indanthrone (Pigment Blue 60 or, alternatively, PB 60 or Vat Blue 4),which has a unique reddish blue shade is particularly preferred.

The crude pigment is dry milled to produce pigment having an average particle size of less than 0.5 µm (preferably from about 0.01 to 0.5 µm). The dry milling step can be carried out using procedures known in the art, such as ball milling, in the presence of a dispersant if desired, but in the absence of organic solvents (although small amounts of water can be tolerated).

Suitable dispersants are the resins or rosins conventionally used achieve to better dispersion of the pigmentary particles and provide increased strength, transparency, and depth of mass tone for the pigments. Such resin or rosin is normally precipitated as free acid or as a metal salt of calcium, barium or zirconium. See, U.S. Pat. No. 4,102,704; French Pat. No. 1,538,270 and Belgian Pat. No. 660,978; which also teach the use of organic amines to react with the resin or rosin. Furthermore, the use of small quantities of wetting agents such as the oleic ester of triethanolamine is taught. The resin acids are include those contained in colophony, such as, for example, abietic or primaric acids or their mixtures, or in a wider sense colophony itself. The resin acids may be modified by disproportionation, hydrogenation or polymerization, or by the action of maleic or fumaric acids; or by partial combination with polyalcohols such as glycerin, pentaerythritol or ethylene glycol so as to obtain acid esters; or by reaction with phenol formaldehyde condensation products or with glycerol and phthalic anhydride, so as to obtain acid resins. Rosinate esters and amides are preferred.

To avoid undesirable crystal growth that can produce particles outside the desired size range of about 0.01 to about 0.5 μm, dry milling is preferably carried out at temperatures below about 80° C. and preferably about 40° to 50° C. Milling must be carried out for a sufficient length of time to allow the particles to reach the desired size range (as determined, for example, by X-ray analysis), but the length of time is not otherwise critical. In general, a period of from about 6 hours up to about 120 hours is sufficient, with the preferred time generally depending on the capacity of the mill used. For example, milling with a laboratory mill might take 2 or 3 days, whereas milling with a plant-scale mill might take only 8 to 12 hours.

The milled pigment is then finished to obtain the required pigmentary size (about 0.1 to 0.2 μm) and form by thoroughly mixing (for example, by stirring) with a finishing solvent mixture comprising water and an aromatic carboxylic acid ester, optionally in the presence of a portion of the dispersant used in the milling. The water and ester can be combined with the milled pigment separately or premixed. Although the exact amount of the solvent mixture used during the finishing process is generally not critical, stirrable slurries typically contain at least about 5.0 parts by weight of water and about 0.8 parts by weight of the ester for each part of the crude pigment. It has generally been found particularly advantageous to use about 3 to about 6 parts by weight (preferably 4 to 5 parts by weight) of water and about 0.4 to about 1.0 parts by weight (preferably 0.6 to 0.8 parts by weight) of the ester for each part of crude pigment. Larger quantities of solvent, although effective, are unnecessary and may even be undesirable for economic and environmental reasons.

The esters are preferably $C_1$-$C_{12}$ alkyl esters of $C_6$-$C_{12}$ monocarboxylic and/or dicarboxylic acids. Suitable aromatic monocarboxylic acids include benzoic acid and naphthoic acids and isomeric forms thereof, as well as aromatic ring-substituted derivatives in which the substituent can be, for example, alkyl, alkoxy, alkanoyl, halogen, hydroxy, amino, nitro, vinyl, and allyl groups. Suitable aromatic dicarboxylic acids include phthalic, isophthalic, terephthalic, and naphthalic acids and the isomeric forms thereof, as well as aromatic ring-substituted derivatives. Suitable $C_1$-$C_{12}$ alkyl groups include methyl, ethyl, propyl, butyl, pentyl, hexyl, heptyl, octyl, nonyl, decyl, undecyl, and dodecyl, and isomeric forms thereof. Esters of dicarboxylic acids can contain two different alkyl groups, although esters having identical alkyl groups are preferred. Preferred organic solvents include $C_1$-$C_4$ alkyl esters of benzoic, phthalic, and salicylic acids, particularly methyl benzoate, methyl salicylate, and dimethyl phthalate. Mixtures of such esters are, of course, also suitable. Esters of aromatic tricarboxylic and tetracarboxylic acids can be used but are less preferred.

The finishing step can be carried out at temperatures in the range of, for example, from about 30° C. to about 145° C. In general, however, temperatures below about 70° C. are less preferred because of a tendency to give less readily dispersed pigment. Although temperatures above about 90° C. can be used, they are less preferred. Finishing must be carried out for a sufficient length of time to allow the particles to attain optimum pigmentary values. Finishing times typically range from about 4 (preferably at least 8 hours) to about 12 hours, but the length of time is not otherwise critical.

The total amount of dispersant used in the milling and finishing steps should range from about 5 to about 50 parts by weight per 100 parts by weight of crude pigment, although it is generally preferred to use no more than a total of 20 parts by weight. It can be used in one of the steps or in both. When used in both, it is preferred that the amount during milling should typically exceed 50% by weight of the total amount of dispersant.

Isolation of the finished pigment can be carried out by any of several methods known in the art. Although it is possible in theory to remove the solvent by physical separation methods, it has been found advantageous to hydrolyze the esters of aromatic carboxylic acids and their by-products removed before the pigment is collected. Hydrolysis of such esters can be carried out, for example, by heating the solvent-containing finished pigment with a strongly alkaline solution (preferably an aqueous solution), such as aqueous sodium or potassium hydroxide. A particularly preferred hydrolysis method involves heating the solvent-containing pigment for about 2 hours at about 85° C. in about 4 to about 10% aqueous sodium hydroxide (prepared, for example, by adding 50% aqueous sodium hydroxide directly to the aqueous finishing mixture). Other hydrolysis methods known in the art can, of course, also be suitable. The carboxylate and alcohol by-products formed during hydrolysis can then be removed (and recovered if desired), for example, during the separation step.

The finished pigment can be collected by methods known in the art, preferably filtration, and then dried. Other collection methods known in the art, such as centrifugation, are suitable but generally less preferred. When the pigment is collected by filtration, the hydrolysis by-products can easily be removed when the pigment filter cake is washed, preferably with water. Although generally less preferred, it is also possible to collect the pigment without first removing all of the carboxylate and/or alcohol by-products or after concomitant chemical precipitation of the carboxylate and/or alcohol. For example, a metal carboxylate salt can often provide advantageous surface properties that enhance pigmentary properties. It can sometimes even be advantageous to leave behind a small portion of a solvent itself if the solvent (for example, dimethyl phthalate) can also serve as a plasticizer for the isolated pigment.

Because of their light stability and migration properties, the pigments prepared according to the present invention are suitable for many different pigment applications. For example, pigments prepared according to the invention can be used as the colorant (or as one of two or more colorants) for very lightfast pigmented systems. Examples include pigmented mixtures with other materials, pigment formulations, paints, printing ink, colored paper, or colored macromolecular materials. Such mixtures include, for example, combinations with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the pigments of the present invention can have any desired shape or form.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLE 1

Three thousand grams of 0.5 inch stainless steel balls were placed in a 1 gallon container together with 125 g of Pigment Blue 60 crude and 12.5 g of Dresinate X (a sodium salt of a pale, tall-oil rosin). The container was then sealed and rolled on a roller miss for 48 hours (2 days).

The resulting subpigmentary pigment powder was separated from the steel balls and added to a one liter beaker along with 625 g of room temperature water. After stirring to wet out the powder, the slurry was transferred to a two liter stainless steel Parr reactor. The reactor was sealed and, with fast agitation (ca. 250 rpm), 100 g of methyl benzoate was added slowly over 20-30 minutes through a dropping funnel. The reactor was heated to 85° C. and that temperature held for 3 hours. The reactor was then cooled to 60° C., and 150 g of aqueous sodium hydroxide (50%) was added slowly through the dropping funnel. The contents were then reheated to 85° C. and held at 85° C. for 2 hours.

Finally, the reactor was cooled to 60° C., the slurry filtered, and washed to a conductivity of <100 μS and a pH of 6-7. After drying at 70° C. (yield 107.1 g), the pigment was ground and passed through a 200 mesh screen.

COMPARATIVE EXAMPLE

One hundred seventy-nine grams of micronized salt and 35 g of PB 60 crude were added to a sigma blade mixer and mixed for 10-15 minutes. Thirty-five grams of propylene glycol was added slowly in 3-12 g portions, allowing the mass to wet out and bind together (about 1.0 to 1.5 hours). Another 11 g of propylene glycol was then added to adjust the stiffness of the mass, after which mixing was continued for another 6 hours. During this time, the temperature climbed to 54° C.±5° C.

The resulting salt cake was discharged and transferred to a 4 liter beaker, with 3200 g of water. After stirring to form a uniform slurry, the pH was adjusted to 1.5 with hydrochloric acid, and the slurry heated to 85-90° C. for for 1 hour. The slurry was cooled to 60° C., filtered, and washed to a conductivity <120% of the initial wash water to form a presscake.

In a one liter beaker, were combined all of the above presscake, 375 g water and a solution of 3.8 g Dresinate X in 40 g water. The slurry was stirred for 10 minutes after which the pH was adjusted from 9.5 to 4.0-4.5 with phosphoric acid, 75%. The slurry was then filtered, and the liquid removed under vacuum. After drying at 70° C. (yield 32.0 g), the pigment was ground and passed through a 200 mesh screen.

When dispersed into polypropylene, the pigment of this invention, Example 1, is superior to the pigment obtained in the Comparative Example in both color and dispersability. The product of the Comparative Example is undesirably weaker, dirtier (ΔC=−1.96 units) and greener (ΔH=−1.36 units) in tint shade and shows a higher level of large undispersed particles when a polypropylene pressout is examined under a microscope.

Various changes and modification can be made without departing from the spirit and scope of this invention. The embodiments disclosed herein were set forth for illustration purposes only and were not intended to limit the invention.

What is claimed is:

1. A process comprising dry milling crude indanthrone pigment to sub-pigmentary size whose average is about 0.5 μm or less and thereafter combining the milled pigment with a solvent mixture of water and an aromatic carboxylic acid ester.

2. The process of claim 1, wherein the milling or combining, or both, is effected in the presence of a dispersant.

3. The process of claim 2, wherein the dispersant is about 5 to 50 parts per hundred crude pigment.

4. The process of claim 3, wherein the dispersant is less than about 20 parts per hundred crude pigment.

5. The process of claim 1, wherein the dry milling is effected at temperatures below about 80° C.

6. The process of claim 1, wherein the dry milling is effected at temperatures of about 40 to 50° C.

7. The process of claim 1, wherein the ester is a $C_1$ to $C_{12}$ alkyl ester of a $C_6$ to $C_{12}$ monocarboxylic or dicarboxylic acid.

8. The process of claim 5, wherein the ester is a $C_1$ to $C_4$ alkyl ester.

9. The process of claim 1, wherein the dry milling is effected such that the milled pigment has a sub-pigmentary size whose average is about 0.01 to 0.5 μm.

10. The process of claim 1, wherein the solvent mixture contains at least about 5 parts water and about 0.8 parts ester per part of crude pigment.

11. The process of claim 10, wherein the solvent mixture contains about 3 to 6 parts water and about 0.4 to 1 parts ester per part of crude pigment.

12. The process of claim 10, wherein the solvent mixture contains about 4 to 5 parts water and about 0.6 to 0.7 parts ester per part of crude pigment.

13. The process of claim 10, wherein the dry milling is effected at temperatures of about 40 to 50° C., the ester is a $C_1$ to $C_4$ alkyl ester of a $C_6$ to $C_{12}$ monocarboxylic or dicarboxylic acid, and the dry milling is effected such that the filled pigment has a sub-pigmentary size whose average is about 0.01 to 0.5 μm.

14. The process of claim 13, wherein the indanthron is underivatized and the ester is a benzoate.

15. The process of claim 1, wherein the indanthrone is underivatized and the ester is a benzoate.

16. A water and aromatic carboxylic acid ester finished indanthrone pigment.

17. An indanthrone pigment produced by the process of claim 15.

18. An indanthrone pigment produced by the process of claim 14.

19. An indanthrone pigment produced by the process of claim 2.

20. An indanthrone pigment produced by the process of claim 1.

* * * * *